Feb. 5, 1963 W. E. COLSON 3,076,539
STORAGE APPARATUS
Filed March 14, 1960 3 Sheets-Sheet 1
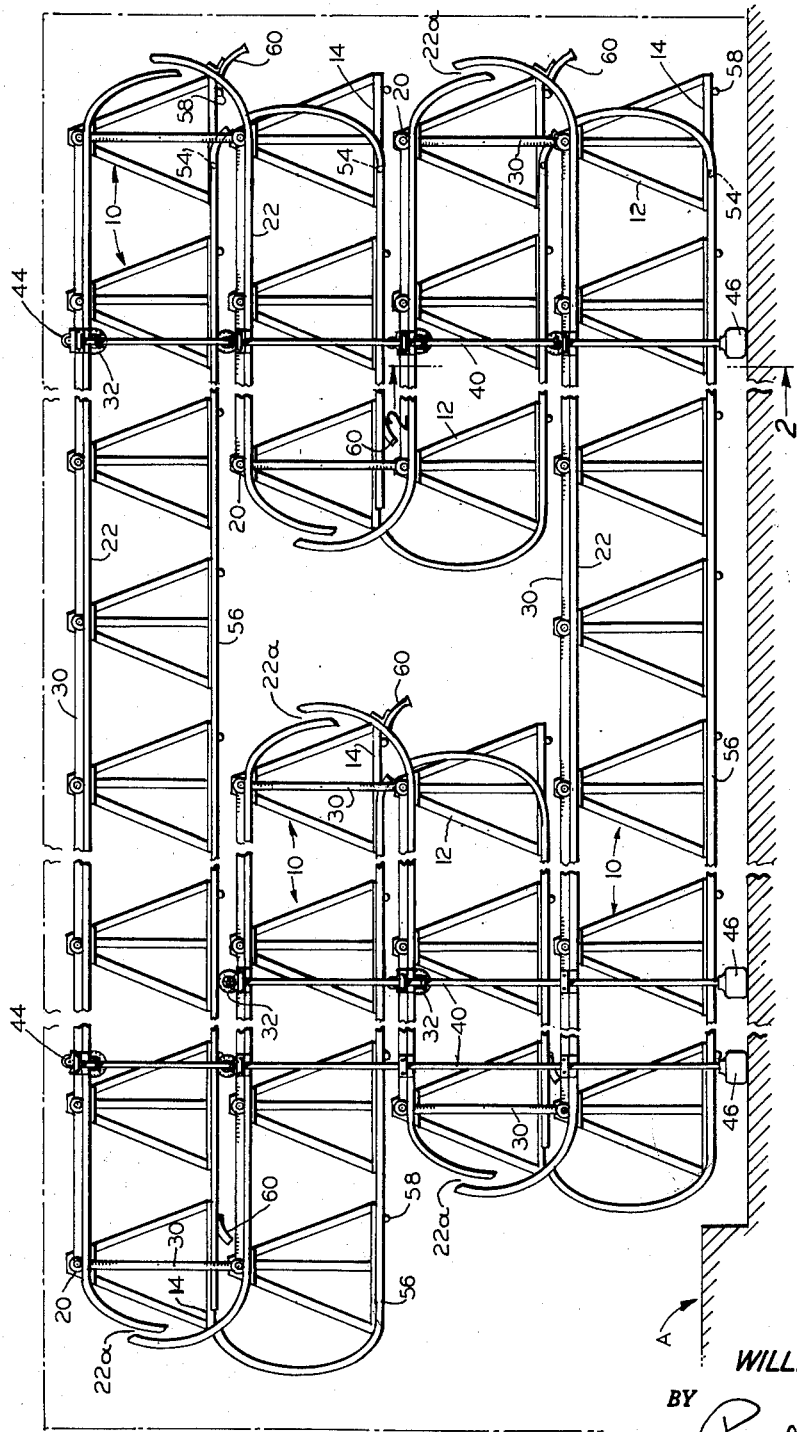
FIG_1
INVENTOR.
WILLARD E. COLSON
BY
Paul B. Fike
PATENT AGENT

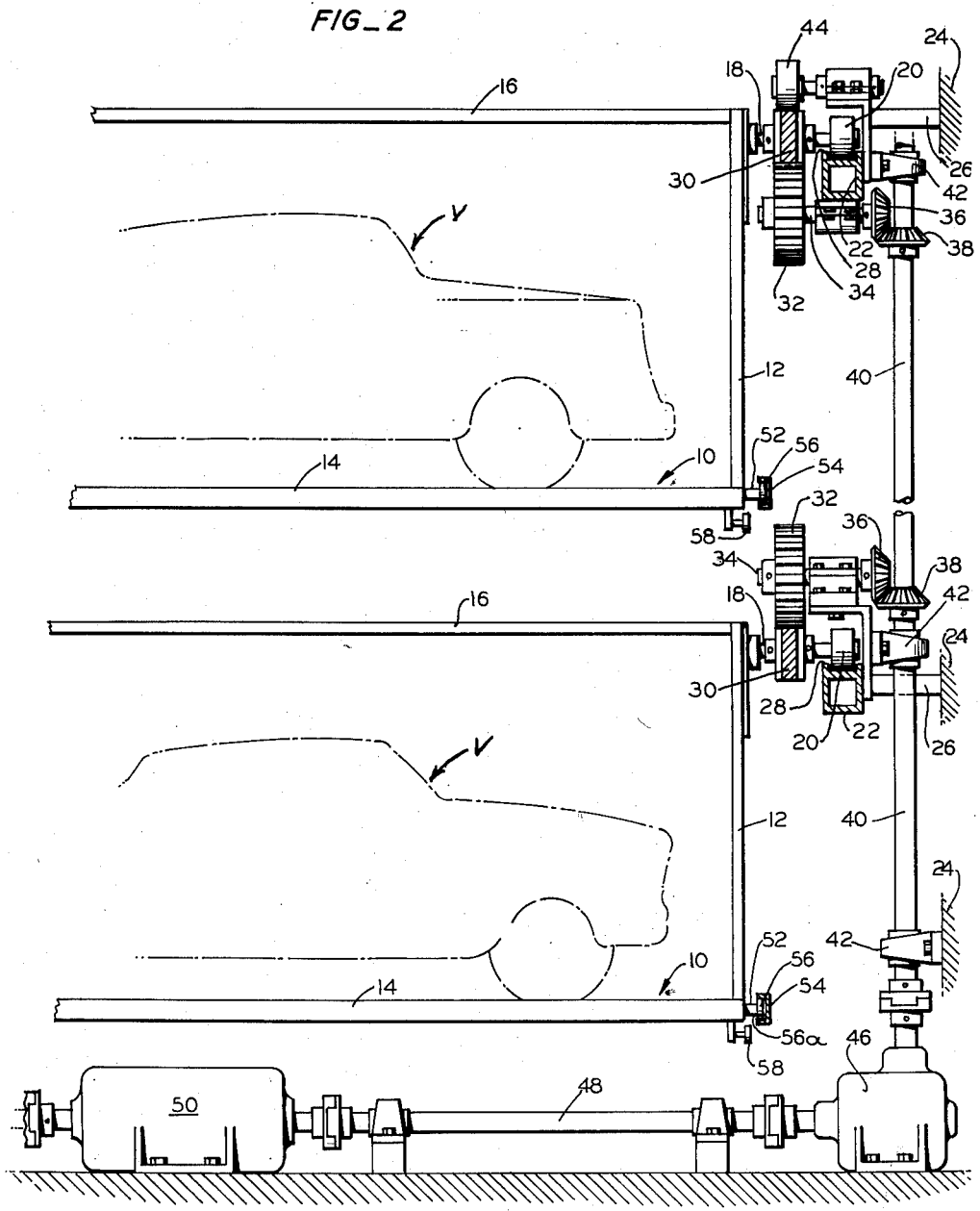

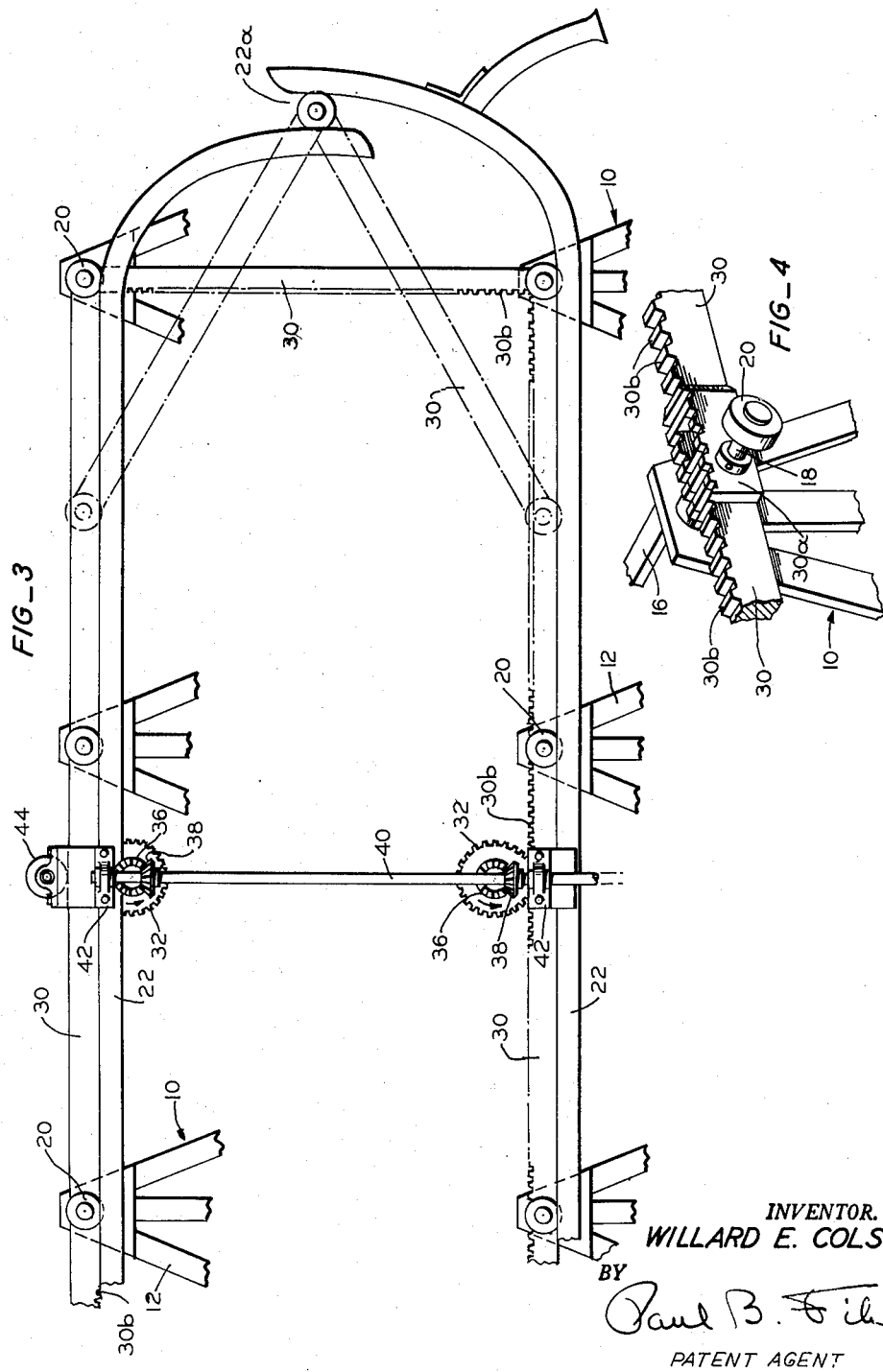

3,076,539
STORAGE APPARATUS
Willard E. Colson, 1344 Westfield Drive, San Jose, Calif.
Filed Mar. 14, 1960, Ser. No. 14,794
1 Claim. (Cl. 198—158)

The present invention relates generally to storage apparatus, and more particularly, to a vehicle parking apparatus that provides for conveyance and storage of the vehicles.

With the increase in population and number of vehicles, particularly in the United States, a vehicle parking problem has been encountered in those metropolitan areas where a high vehicle concentration exists. In these areas, land costs become exorbitant so that multistoried garages have been constructed. While the resultant vertical as well as horizontal distribution of the vehicles has somewhat alleviated the land cost problem, other equally serious problems have been presented in its stead. Obviously, the cost of the multistoried building must be considered, and, perhaps more important, the time for delivery or access time of a particular vehicle has increased tremendously. In certain metropolitan garages, a customer may wait 20 or 30 minutes for delivery of his car even though numerous parking attendants are employed. Furthermore, it is quite obvious that the additional cost of labor thus required further increases the unit parking cost to the customer.

While the invention is primarily concerned with the very pressing problem of vehicle parking, and the following remarks and description will be specifically addressed to such problem, it will be apparent that the apparatus described can, through obvious modifications primarily of size alone, be utilized for storage of other articles wherein the same general problems are encountered. For example, the application to the temporary storage and expeditious access to luggage at a train or air line terminal will be immediately obvious.

Accordingly, it is a general object of the present invention to provide an article storage apparatus and more particularly a vehicle parking apparatus which provides for both vertical and horizontal distribution of the parked vehicles yet enables a maimimum access time to any vehicle while at the same time maintaining building and labor costs at a minimum level.

More particularly, it is a feature of the present invention to provide a vehicle parking apparatus including a plurality of vehicle carriers, each movable on an endless conveyor from a loading station to any one of a plurality of storage stations in a manner providing for both horizontal and vertical distribution of the stored vehicles.

It is an additional feature of the invention to provide a vehicle parking apparatus of the general type mentioned wherein the relatively rapid motion of such conveyor enables minimum access time to any one of the stored vehicles.

Additionally, it is a feature of this invention to provide a vehicle parking apparatus including a large number of individual vehicle carriers arranged on the aforementioned conveyor for horizontal and vertical movement along a generally sinuous path so that the space requirements for vehicle storage are minimized.

It is a further feature of the invention to provide a vehicle parking apparatus wherein the aforementioned carriers are maintained in minimum but non-interfering spaced relation during their conveyance and, furthermore, are retained in the desired disposition for secure support of the vehicle.

Another feature is the provision for the effective support of the individual carriers from a rigid, encompassing building or other structure to provide a balanced load distribution.

These as well as other objects and features of the invention will become more apparent from a perusal of the following description of the parking apparatus illustrated in the accompanying drawings wherein:

FIG. 1 is a side elevational view of a parking apparatus embodying the invention, FIG. 2 is a fragmentary transverse sectional view on an enlarged scale and taken substantially along line 2—2 of FIG. 1, FIG. 3 is an enlarged fragmentary side view of a portion of the apparatus illustrating details of its construction and operation, and FIG. 4 is a fragmentary perspective view of a portion of the apparatus, showing in detail the support and drive arrangement for the individual vehicle carriers.

Generally, the present invention includes a plurality of individual vehicle carriers, each indicated generally by the numeral 10, that are arranged in spaced, supported relation for movement about a closed or endless path at one point along which is a loading station indicated at A in FIG. 1 where vehicles to be parked and stored can be placed upon the carriers. Each carrier 10 consists of a pair of like generally triangular end frames 12 having their base portions joined in bridging relationship by a platform 14 on which an automobile or other vehicle V is adapted to rest. The dimensions of such platform 14 are sufficient to enable the support of the largest standard automobile lengthwise between the triangular end frames 12, as is best indicated by reference to FIG. 2. At their upper apexes, the triangular end frames 12 are joined by a rigid tie bar 16 so that the entire carrier structure is a rigid structural unit.

To provide movable and pivotal support for the carriers 10, rods 18 project from opposite ends of the carrier adjacent the apexes of the triangular frames 12 and mount rollers 20 at their outer extremities. Each roller 20 is arranged to move along and be supported on the upper surface of a substantially endless track 22 that, in turn, is rigidly supported from exterior structural members 24 by brackets such as indicated at 26 in FIG. 2, or from the side walls of an enclosing building, if the same is desired. It is, of course, not pertinent to the present invention whether an enclosing building or mere structural members are employed, and the same is therefore merely indicated by the phantom line in FIG. 1. So that the rollers 20 will be maintained in the desired position on the track 22 as they move lengthwise therealong, upstanding flanges 28 are integrally formed to laterally encompass the sides of the rollers.

The roller-supporting track 22 is of generally sinuous and substantially endless configuration, consisting of a plurality of superposed, parallel horizontal sections which are, in turn, joined at their ends by curved sections. These curved end sections are broken, as indicated at 22a, so that the support for each carrier 10 can be transferred from the upper surface of a track section at one level to the upper surface of a track section at the next upper or lower level, as the case may be, as will be clearly understood by reference to FIGS. 1 and 3.

Since during the transfer from one track section to that above or below the same removes the direct roller support of the carriers 10, interim support during the transfer is provided by rigid links 30, each of which is pivotally joined at its opposite ends, as indicated at 30a in FIG. 4, to the projecting support rods 18 of the adjacent carriers. Thus, as can best be visualized by reference to FIG. 3, a carrier 10 being moved from one level upwardly to the next is supported at its intermediate position through compressive force through the link 30 joining this carrier to the adjacent carrier still supported on the lower track sections, and additionally, by tensional support through the link which connects the intermediate carrier to that already resting on the upper track section.

Since the described links 30 are rigid, it is obviously necessary that the sections of the track 22 at adjacent levels be spaced a distance at least as great as the length of each link and preferably a distance equivalent to the length of such link, as shown in the drawings. Furthermore, the curvature of the connecting end sections of the track 22 is predetermined since each carrier 10, and more particularly, its supporting roller 20, must follow a generally elliptical path constituting, more specifically, the locus of a point equidistant from two spaced points moving along parallel paths but in opposite directions. For practical installations, the length of each link 30 should be approximately 8 feet as this insures proper spacing between adjacent carriers 10 and also enables the accommodation on the carriers of any standard automobile.

In addition to providing appropriate spacing between adjacent carriers 10 and also providing support therefor during their movement from one track level to another, the carrier-connecting links 30 are formed with teeth 30b along one surface to enable enmeshment with drive gears 32 to provide motive power for the carriers. More particularly, as shown best by reference to FIG. 4, each link 30 is bifurcated at one end where it is pivotally joined, as shown at 30a, to one of the projecting rods 18 of the carrier 10 and encompasses between its bifurcated end the end of the adjoining link 30 which, of course, is also pivotally secured to the projecting rod of the carrier. The gear teeth 30b of the joined links 30 are arranged in registry so that a substantially continuous rack-type gearing is provided to form a conveyor mechanism that is driven by the mentioned drive gears 32 which engage the links at various positions along the entire length of the conveyor mechanism. At each such position, the gear 32 in mesh with the toothed links 30 is mounted at the end of a stub shaft 34 suitably supported from the rigid exterior structural members 24 of the apparatus and carrying at its outer, remote end a bevel gear 36 which in turn meshes with another bevel gear 38 on a vertically-extending shaft 40 secured at intervals along its vertical extension in bearings 42 also supported from the structural members 24. When the gear teeth 30b of the links 30 project upwardly, the drive gear 32 is, of course, positioned above such links, but when the links 30 are moved to the next level and are accordingly inverted, the drive gear 32 must, of course, be positioned under the links 30 to provide the desired meshing engagement. In this latter circumstance, it is preferable to mount an additional roller 44 for contact with the upper surface of the links 30 immediately above the drive gear 32 to thus maintain the meshing engagement between the links and the drive gear. Since each of the superposed drive gears 32, as shown in FIG. 3, are driven from the same vertically-extending shaft 40, synchronous drive to various portions of the links 30 and the carriers 10 supported thereon results. The lower end of the vertically-extending drive shaft 40 projects upwardly from a suitable gear reducer 46 which is, in turn, coupled by a horizontal shaft 48 to a suitable drive motor 50. This drive motor 50 is positioned substantially centrally under the entire structure and the drive shaft 48 projects both ways from the central position of the motor through like gear and shaft arrangements on both sides of the tracks so that the carriers are driven from both ends. Additional horizontal and vertical shafts, as indicated in FIG. 1, can be connected in like manner to the links 30 at yet other positions along the conjoined length.

The drive gear and shaft arrangement, as described, provides for a linear speed of the carriers 10 approximately equal to 2 feet per second, such speed requiring relatively small amounts of power yet enabling relatively good access to any carrier on the entire structure. For example, the carrier furthest removed from the loading station in FIG. 1 will require only one and one-half minutes to be brought to the loading station. In turn, the power requirements are minimized since even though all carriers 10 contain vehicles, some of the vehicles will be moving upwardly while others move downwardly so that a substantial balance of forces in the vertical direction can be achieved and only rolling friction need be overcome for movement of the carriers along the horizontal track sections.

Since the carriers 10 are pivotally supported at their upper ends, a pin 52 is arranged to project outwardly from the lower end of each carrier and to carry a roller 54 that rides in a longitudinal slot 56a in the side of a rigidly-supported rail 56 to thus provide for the maintenance of a stable disposition of each carrier during its motion. As shown best in FIG. 1, such stabilizing rail 56 is substantially continuous, being interrupted only at a portion of each curved end section to allow passage of the supporting rods 18 and rollers 20 from one track level to another. In order to maintain stability of the carrier 10 when its pin 52 is moving from the exit end of one portion of the broken stabilizing rail 56 to the entrance end of the next portion, a second pin, with attached roller 58, is disposed at another position on each carrier frame and engages a short bridging section of stabilizing rail 60 during such interruption of the primary stabilizing arrangement.

If it is assumed that the parking apparatus is in the position illustrated in FIG. 1, an automobile at the loading station A is lifted by a suitable transfer dolly such as a specially designed fork-lift truck, whose details form no part of the present invention, and is placed on the adjacent carrier platform 14. The dolly is then removed from engagement with the automobile and through energization of the motor 50, the apparatus is put into motion. Preferably, a conventional reversing switch (not shown) is provided in the motor circuit so that the entire conveyor mechanism can move in one direction or the other, as selected by the attendant. Upon energization of the motor 50, power is transferred through the gears and shafting to propel the links 30 and the carriers 10 supported thereby in the appropriate direction. The next automobile to be parked is then brought to the loading station A and the apparatus momentarily stopped so that the loading operation for this vehicle can be performed in the manner briefly described with respect to the first vehicle. Preferably, the attendant will keep the vehicles spaced at substantially equal intervals along the entire conveyor structure so that the desired balancing of forces is achieved.

If a customer desires to obtain his parked car, it is merely necessary for the attendant to again actuate the conveyor in the appropriate direction to bring the vehicle on its carrier to the loading station A whereat the transfer dolly can be utilized to remove the vehicle from the carrier and deposit it on the parking area driveway.

Various modifications and/or alterations can obviously be made without departing from the spirit of the invention, and the foregoing description of one embodiment of the invention is to be considered as purely exemplary and not in a limiting sense. The actual scope of the invention is to be indicated by reference to the appended claim.

What is claimed is:

Article storage apparatus which comprises a plurality of carriers, each adapted to receive and support an individual article, a supporting rod connected to each of said carriers and having a roller thereon, a track having vertically-spaced, substantially horizontal, straight portions and overlapping curved end portions constituting continuations of said straight portions for maintaining continuous engagement with said carrier-supporting rollers, rigid links of equal length pivotally connected between adjacent carrier-supporting rods, the length of each of said links being equal to the vertical distance between said straight portions of said track, and means for moving said carriers along said track, said curved end portions of said track being of generally elliptical configuration constituting the locus of a point, defined by one of said supporting rods, at fixed and equal distances, defined by the lengths of said rigid links, from each of two points, defined by the adjacent carrier-supporting rods, moving along parallel paths, defined by said horizontal straight track portions, but in opposite directions.

References Cited in the file of this patent

UNITED STATES PATENTS

| | | |
|---|---|---|
| 1,815,738 | MacDonald | July 21, 1931 |
| 2,731,160 | Maier | Jan. 17, 1956 |
| 2,761,572 | Baker | Sept. 4, 1956 |
| 2,794,559 | Rowe | June 4, 1957 |
| 2,878,921 | Clark | Mar. 24, 1959 |

FOREIGN PATENTS

| | | |
|---|---|---|
| 510,491 | Italy | Jan. 21, 1955 |